United States Patent
Hase et al.

(10) Patent No.: US 9,840,924 B2
(45) Date of Patent: Dec. 12, 2017

(54) GAS TURBINE SYSTEM WITH A TRANSITION DUCT HAVING AXIALLY EXTENDING COOLING CHANNELS

(71) Applicant: SIEMENS AKTIENGESELLSCHAFT, München (DE)

(72) Inventors: Matthias Hase, Mülheim (DE); Paul A. Sanders, Charlotte, NC (US); Vaidyanathan Krishnan, Chennai (IN)

(73) Assignee: SIEMENS AKTIENGESELLSCHAFT (DE)

( * ) Notice: Subject to any disclaimer, the term of this patent is extended or adjusted under 35 U.S.C. 154(b) by 406 days.

(21) Appl. No.: 14/460,878

(22) Filed: Aug. 15, 2014

(65) Prior Publication Data

US 2016/0047312 A1    Feb. 18, 2016

(51) Int. Cl.
F01D 9/02       (2006.01)
F23R 3/00       (2006.01)
(Continued)

(52) U.S. Cl.
CPC ............... F01D 9/023 (2013.01); F02C 7/18 (2013.01); F23R 3/002 (2013.01); F23R 3/005 (2013.01); F23R 3/02 (2013.01); F23R 3/04 (2013.01); F23R 3/06 (2013.01); *F01D 25/12* (2013.01); *F05D 2260/202* (2013.01);
(Continued)

(58) Field of Classification Search
CPC ...... F01D 9/023; F02C 7/18; F05D 2260/202; F05D 2260/204; F23R 3/002; F23R 3/005; F23R 3/02; F23R 3/04; F23R 3/06; F23R 3/08; F23R 2900/00017; F23R 2900/03041; F23R 2900/03042; F23R 2900/03043; F23R 2900/03044; F23R 2900/03045
See application file for complete search history.

(56) References Cited

U.S. PATENT DOCUMENTS

| 6,282,905 B1 * | 9/2001 | Sato ................. F23R 3/002 60/752 |
| 2005/0047907 A1 * | 3/2005 | Nordlund ............ F01D 9/023 415/116 |

(Continued)

FOREIGN PATENT DOCUMENTS

| JP | S62-131929 A | 6/1987 |
| JP | S62-150543 U | 9/1987 |

(Continued)

OTHER PUBLICATIONS

Notice of Reasons for Rejection dated Oct. 2, 2017 in corresponding Japanese Patent Application No. 2016-571414 (with English language translation)(total 9 pages).

*Primary Examiner* — Gerald L Sung
*Assistant Examiner* — Scott Walthour
(74) *Attorney, Agent, or Firm* — Ostrolenk Faber LLP

(57) ABSTRACT

A gas turbine system (1) including a burner arrangement having a tubular combustion chamber (5), a turbine (6) and a transition duct (7) connecting the combustion chamber (5) and the turbine (6), wherein the transition duct (7) is provided with an axially extending cooling air channel (11). The transition duct (7) includes a plurality of axially extending cooling air channels, and wherein each cooling air channel (11) is provided with one single inlet (12) opened to the outside of the transition duct (7) and with one single outlet (12) opened to the inside of the transition duct (7).

10 Claims, 8 Drawing Sheets

(51) Int. Cl.
    *F23R 3/02*     (2006.01)
    *F23R 3/04*     (2006.01)
    *F23R 3/06*     (2006.01)
    *F02C 7/18*     (2006.01)
    *F23R 3/08*     (2006.01)
    *F01D 25/12*     (2006.01)

(52) U.S. Cl.
    CPC .......... *F05D 2260/204* (2013.01); *F23R 3/08* (2013.01); *F23R 2900/00017* (2013.01); *F23R 2900/03041* (2013.01); *F23R 2900/03042* (2013.01); *F23R 2900/03043* (2013.01); *F23R 2900/03044* (2013.01); *F23R 2900/03045* (2013.01)

(56) References Cited

U.S. PATENT DOCUMENTS

| | | |
|---|---|---|
| 2006/0130484 A1 | 6/2006 | Marcum et al. |
| 2008/0276619 A1 | 11/2008 | Chopra et al. |
| 2010/0180601 A1* | 7/2010 | Ishiguro ............ F23R 3/005 60/755 |
| 2014/0144147 A1 | 5/2014 | Kishida |
| 2015/0107262 A1* | 4/2015 | Maurer ............ F01D 9/023 60/785 |

FOREIGN PATENT DOCUMENTS

| | | |
|---|---|---|
| JP | H10-153129 A | 6/1998 |
| JP | H11-125378 A | 5/1999 |
| JP | 2005-105817 A | 4/2005 |
| WO | WO 98/16764 A1 | 4/1998 |

* cited by examiner

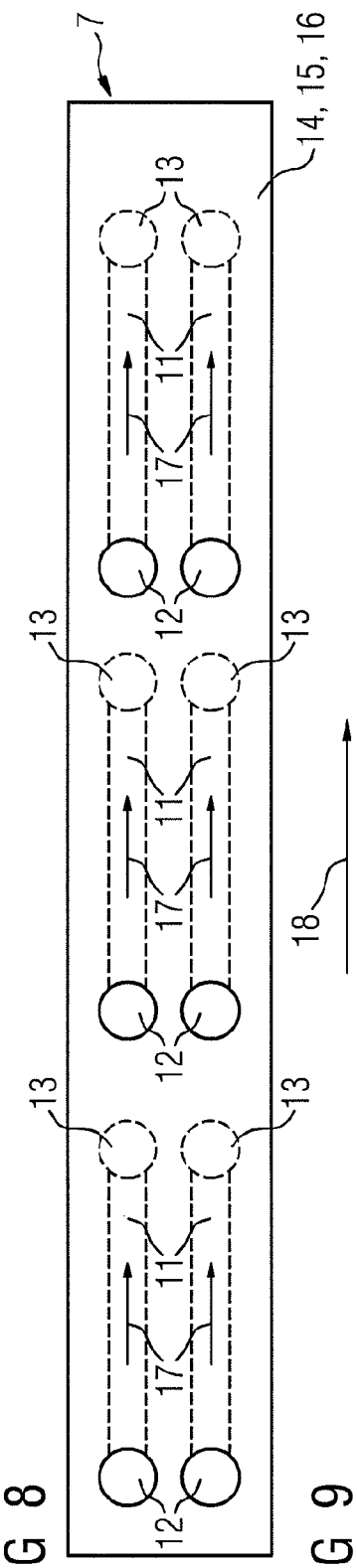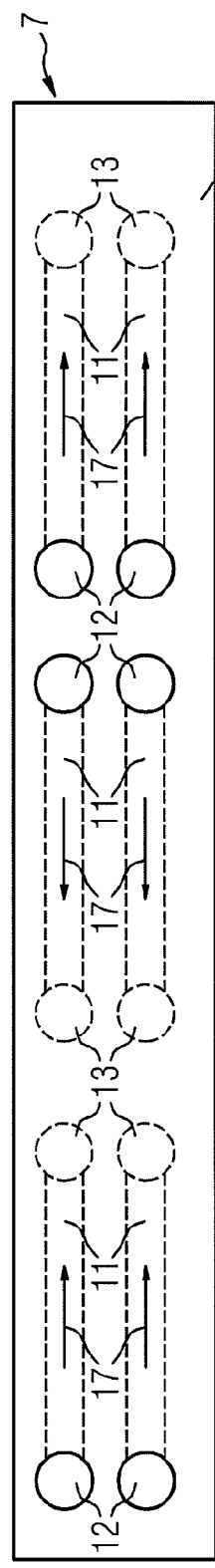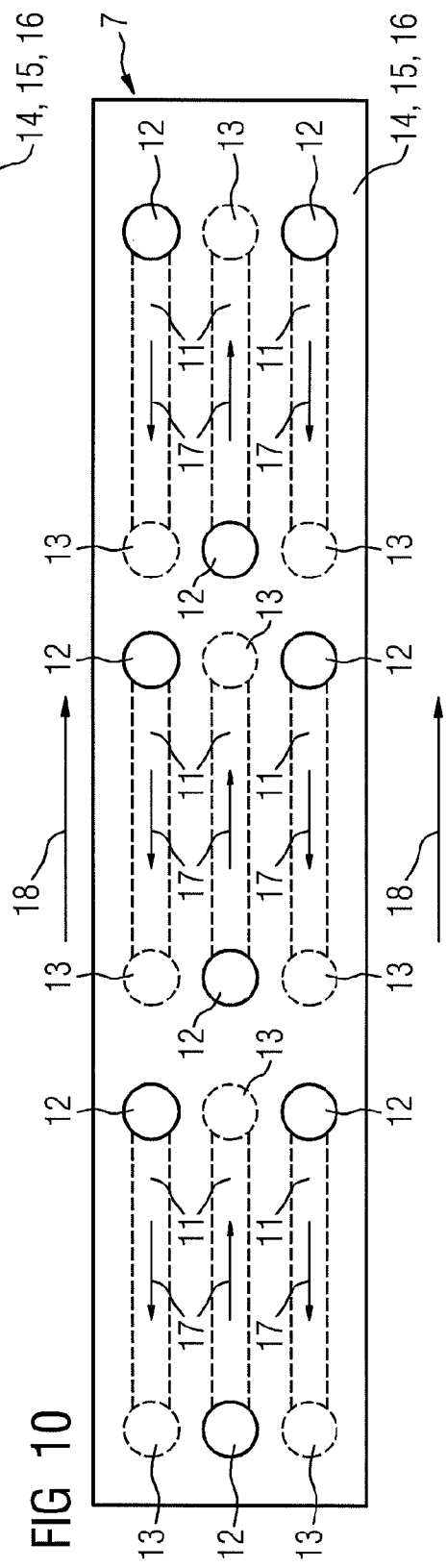

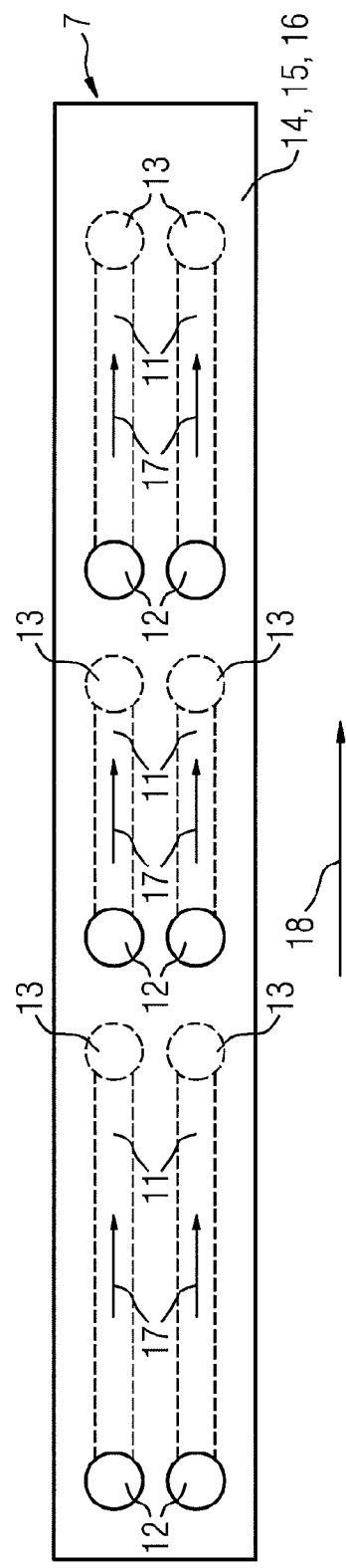

GAS TURBINE SYSTEM WITH A TRANSITION DUCT HAVING AXIALLY EXTENDING COOLING CHANNELS

TECHNICAL FIELD

The present invention relates to a gas turbine system comprising a burner arrangement having a tubular combustion chamber, a turbine and a transition duct connecting the combustion chamber and the turbine, wherein the transition duct is provided with an axially extending cooling air channel.

TECHNICAL BACKGROUND

Gas turbine systems of the above mentioned kind are known in prior art. During the operation, ambient air is compressed and directed towards the burner arrangement. Inside the burner arrangement the compressed air is mixed with fuel, and the created fuel-air-mixture is ignited within the combustion chamber to generate hot combustion gases, which are directed towards the turbine via the transition duct. The turbine extracts rotational energy from the hot combustion gases and drives a load, such as a generator.

With increasing operating temperatures it is often necessary to cool components of a gas turbine system in order to counteract a limitation of a useful life of the gas turbine system. In this context it is known to provide the transition duct with a cooling air channel extending axially substantially over the entire length of the transition duct and having multiple inlets and multiple outlets. As used herein the terms "axial" and "axially" refer to directions and orientations extending substantially parallel to the longitudinal axis of the transition duct. Such a cooling air channel design has the drawback that the cooling air distribution has a significant uncertainty due to the multiple inlets and outlets, which needs to be covered by additional cooling air.

However, additional cooling air negatively affects the aim to meet low NOx emissions.

SUMMARY OF THE INVENTION

Starting from this prior art it is an object of the present invention to provide a gas turbine system of the above-mentioned kind having an alternative structure contributing to the aim to meet low NOx emissions over a broad load range.

In order to solve this object the present invention provides a gas turbine system of the above-mentioned kind, characterized in that the transition duct is provided with a plurality of axially extending cooling air channels, wherein each cooling air channel is provided with one single inlet opened to the outside of the transition duct and with one single outlet opened to the inside of the transition duct. Thanks to this inventive design of the cooling air channels the reliability of the cooling air distribution is significantly improved, whereby the cooling air consumption is reduced. Accordingly, the cooling air channel design of the present invention positively affects the NOx emissions of the gas turbine system while maintaining an effective cooling.

Preferably, the ends of at least some circumferentially neighboring cooling air channels are arranged with an offset in axial direction such that the cooling air channels partly overlap each other when viewed in the circumferential direction. Such a staggering of the cooling air channels increases the mechanical robustness of the transition duct.

According to one aspect of the present invention at least some of the cooling air channels extend substantially over the entire length of the transition duct.

In addition or alternatively at least some of the cooling air channels are arranged consecutively in axial direction. This design is beneficial for cases with higher heat loads.

According to a further aspect of the present invention, at least some of the cooling air channels, which are consecutively arranged in axial direction, are aligned with each other.

In addition or alternatively, at least some of the cooling air channels, which are consecutively arranged in axial direction, are arranged with an offset in axial direction in relation to at least one circumferentially neighboring cooling air channels.

According to yet a further aspect of the present invention at least some of the cooling air channels have different flow cross sections.

At least some of the cooling air channels may have a co-flow arrangement with respect to the combustion gases directed through the transition duct.

In addition or alternatively, at least some of the cooling air channels may have a counter-flow arrangement with respect to the combustion gases directed through the transition duct.

By means of choosing the adequate number of cooling air channels, the adequate length, flow cross section and flow direction for each cooling air channel, and the adequate relative positions of the cooling air channels, it is possible to locally adjust the cooling efficiency and the mechanical robustness of the transition duct.

Preferably, the transition duct comprises a three layer bonded panel design, wherein the middle layer is provided with elongated cutouts defining the cooling air channels, and wherein the outer layer and the inner layer are provided with holes defining the inlets and the outlets of the cooling air channels. Such a structure of the transition duct can easily be produced at low costs.

Advantageously the free end of the combustion chamber is inserted in the transition duct in order to simplify the assembly of the gas turbine system.

BRIEF DESCRIPTION OF THE DRAWINGS

Further features and advantages of the present invention will become apparent by means of the following description of different embodiments of gas turbine systems according to the present invention with reference to the accompanying drawings. In the drawings

FIG. 8 is a schematic top partial view of cooling air channels as shown in FIG. 2 formed according to a seventh design of the present invention;

FIG. 9 is a schematic top partial view of cooling air channels as shown in FIG. 2 formed according to an eighth design of the present invention;

FIG. 10 is a schematic top partial view of cooling air channels as shown in FIG. 2 formed according to a ninth design of the present invention;

FIG. 14 is a schematic top partial view of cooling air channels as shown in FIG. 2 formed accordingly to a thirteenth design of the present invention.

DESCRIPTION OF EMBODIMENTS

Figure 1:
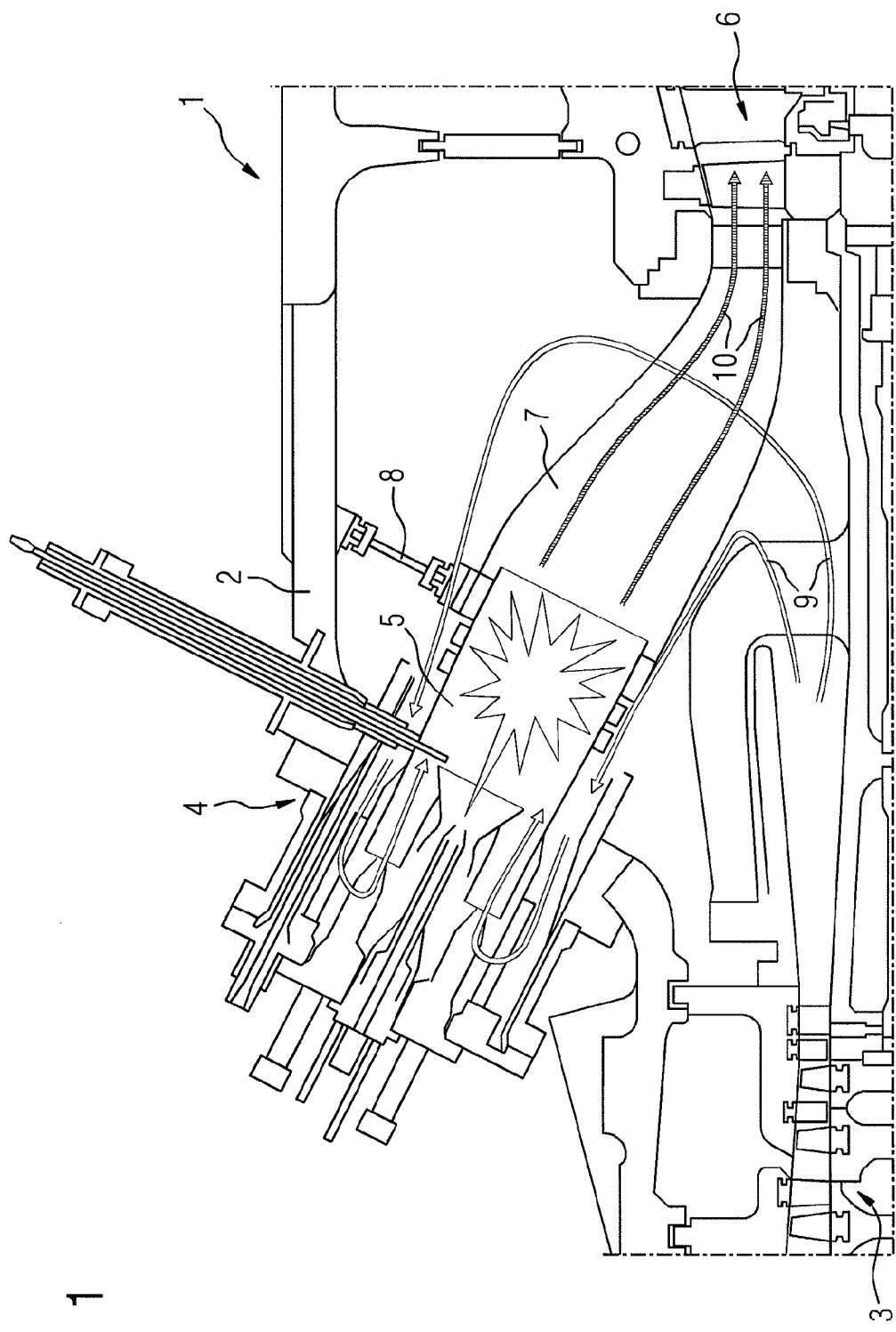
FIG. 1 is a schematic view of an exemplary gas turbine system according to an embodiment of the present invention.

FIG. 1 shows a gas turbine system 1 according to an embodiment of the present invention. The gas turbine system 1 comprises a multi-part housing 2, a compressor 3 arranged within the housing 2, a burner arrangement 4, which is fixed to the housing 2 and is provided with a combustion chamber 5, a turbine 6 arranged within the housing 2 and a transition duct 7 connecting the combustion chamber 5 and the turbine 6. During the assembly of the gas turbine system 1, the transition duct 7 is connected to the turbine 6. Moreover, the transition duct 7 is adjusted and fixed to the housing 2 by means of a fixture 8. Subsequently the burner arrangement 4 is inserted in the housing through an associated opening of the housing, whereupon the free end of the combustion chamber 5 is entered in the transition duct 7. Afterwards the combustion chamber 5 and the transition duct 7 are adjusted to each other, and the burner arrangement 4 is fixed to the housing 2.

During operation of the gas turbine system 1 the compressor 3 compresses ambient air and directs the compressed air towards the burner arrangement 4 as shown by means of arrows 9 in FIG. 1. Within the burner arrangement 4 the compressed air is mixed with fuel, whereupon the resulting fuel-air-mixture is ignited and burned within the combustion chamber 5 of the burner arrangement 4. The hot combustion gases are directed through the transition duct 7 towards the turbine 6 as shown by arrows 10 in order to drive the turbine 6 in known manner.

Figure 2:
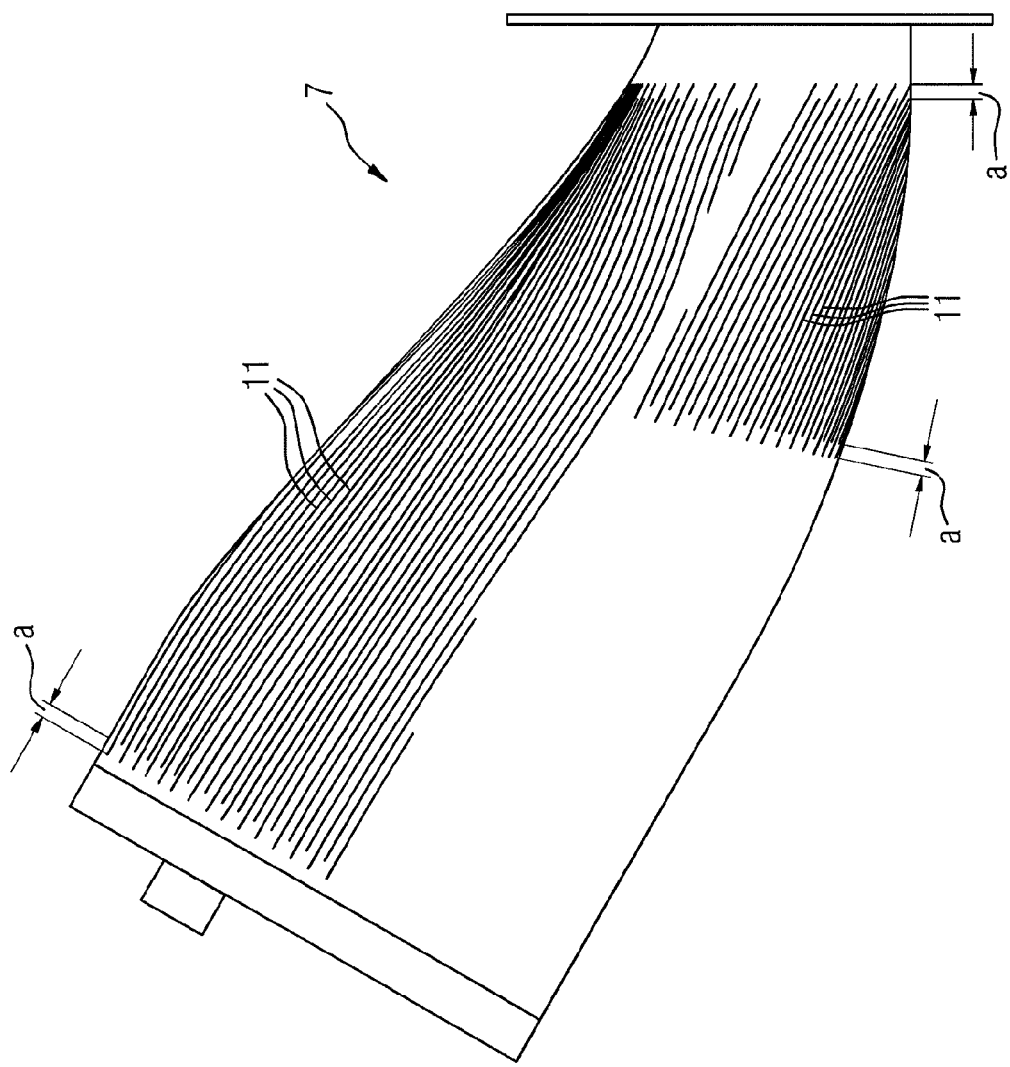
FIG. 2 is a schematic view of a transition duct of the gas turbine system shown in FIG. 1, wherein the transition duct is provided with a plurality of axially extending cooling air channels.

In order to withstand high operating temperatures, the transition duct 7 is provided with a plurality of axially extending cooling air channels 11 as shown in FIG. 2. Each cooling air channel 11 is provided with one single inlet 12 opened to the outside of the transition duct 7 and with one single outlet 13 opened to the inside of the transition duct 7, wherein the inlets 12 and the outlets 13 are formed at opposing ends of the cooling air channels 11, respectively. In the shown cooling air channel design, most of the cooling air channels 11, which are provided on the hotter upper part of the transition duct 7, extend substantially over the entire length of the transition duct 7 in order to ensure effective cooling. Most of the cooling air channels 11, which are provided on the colder lower part of the transition duct 7, merely extend over a part of the length of the transition duct 7 to the downstream end of the transition duct 7. However, please note that this cooling air channel distribution only serves as an example and is not to be understood constrictive. It is rather possible to distribute the cooling air channels 11 over the transition duct 7 in a different manner. The ends of circumferentially neighboring cooling air channels 11 are arranged with an offset a in axial direction, respectively. This staggering of the cooling air channels 11 increases the mechanical robustness of the transition duct 7. The single cooling air channels 11 may be arranged in a co-flow and/or in a counter-flow arrangement with respect to the combustion gases directed through the transition duct 7, as it is explained in more detail below. The transition duct 7 comprises a three layer bonded panel design, wherein the middle layer 14 is provided with elongated cutouts defining the cooling air channels 11, and wherein the outer layer 15 and the inner layer 16 are provided with holes defining the inlets 12 and the outlets 13 of the cooling air channels 11. In FIG. 2, the outer layer 15 is not shown in order to illustrate the cooling air channels 11. However, it should be noted that other designs are possible, too, such as a two layer bond panel design, where one of the layers is twice the thickness of the other, where the cooling air channels are machined into the thick layer and the second layer is bonded to it, and where the inlets are formed in one of the layers and the outlets are formed in the other.

FIGS. 3 to 13 show different cooling air channel designs according to the present invention, wherein the same reference numerals are used to denote same or similar components or features.

Figure 3:
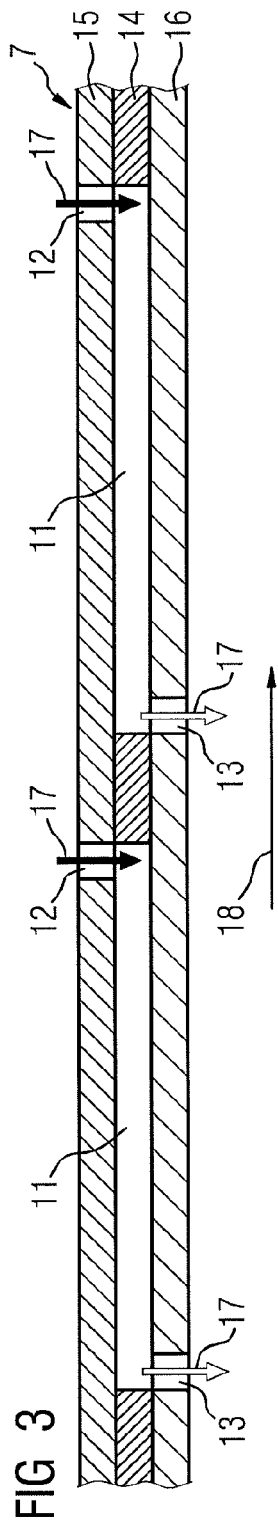
FIG. 3 is a schematic cross-sectional view of cooling air channels as shown in FIG. 2 formed according to a second design of the present invention.

FIG. 3 shows a second cooling air channel design according to the present invention. According to this first design two of the cooling air channels 11 are arranged consecutively in axial direction and are aligned with each other. By arranging a plurality of cooling air channels 11 consecutively in axial direction the cooling performance is increased. In the case shown the flow direction of the cooling air, which is represented by arrows 17, and the flow direction of the hot gases passing through the transition duct 7, which is represented by arrow 18, is counter flow.

Figure 4:
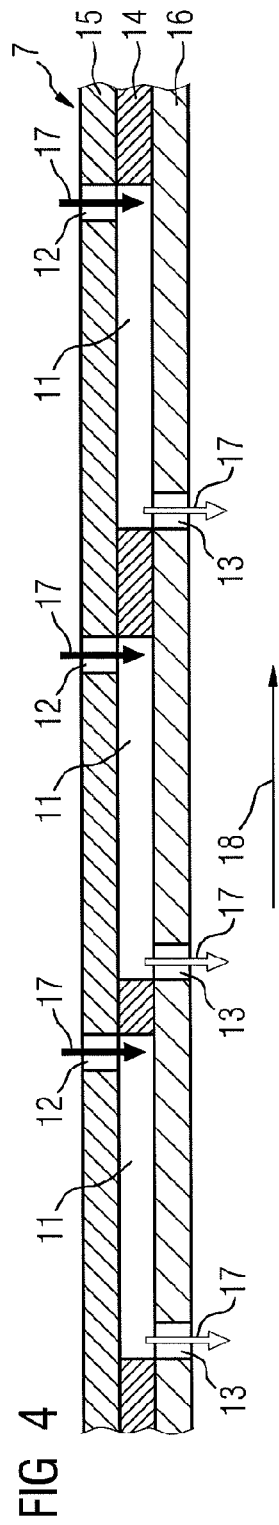
FIG. 4 is a schematic cross-sectional partial view of cooling air channels as shown in FIG. 2 formed according to a third design of the present invention.
Figure 5:
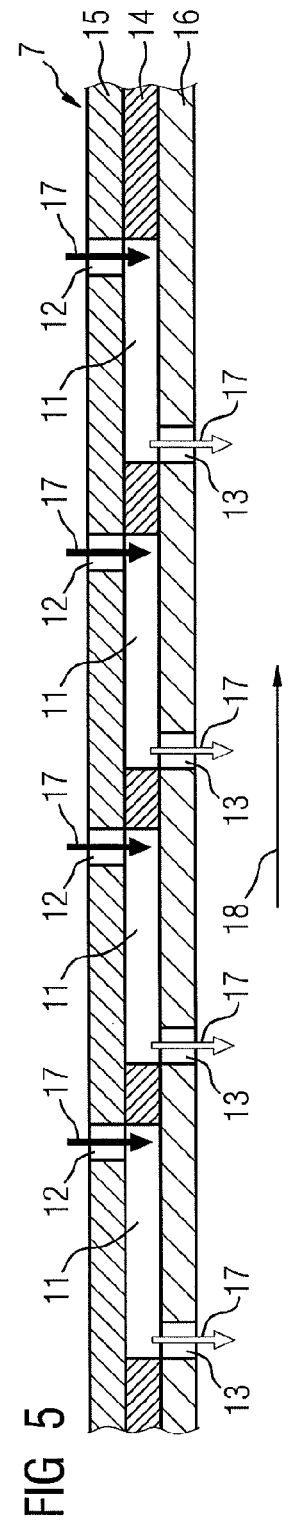
FIG. 5 is a schematic cross-sectional partial view of cooling air channels as shown in FIG. 2 formed according to a fourth design of the present invention.

FIGS. 4 and 5 show a third and a fourth cooling channel design similar to the one shown in FIG. 3. However, instead of two cooling channels operated in counter flow with respect to the hot gas flow direction there are provided three or rather four cooling air channels 11 operated in counter flow, which are arranged consecutively in axial direction and are aligned with each other. These designs are beneficial for cases with higher heat loads.

Figure 6:
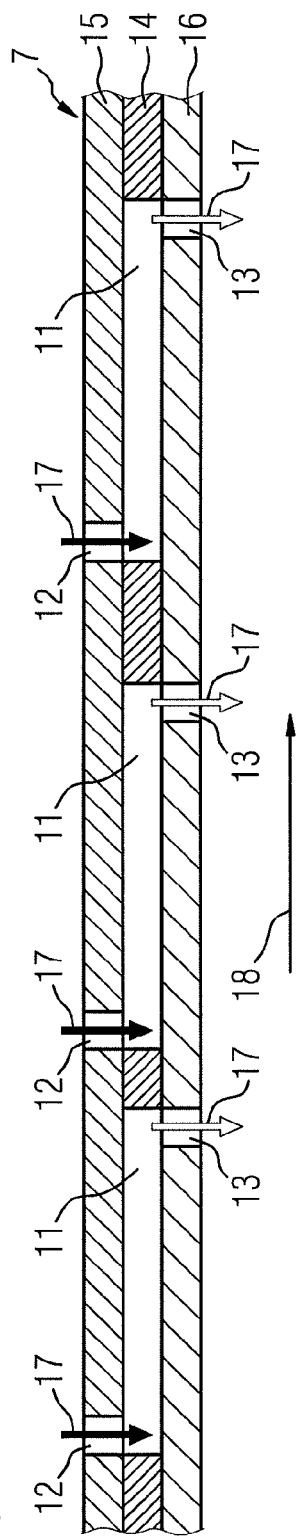
FIG. 6 is a schematic cross-sectional partial view of cooling air channels as shown in FIG. 2 formed according to a fifth design of the present invention.

FIG. 6 shows a fifth cooling channel design similar to the one shown in FIG. 4 with three cooling air channels 11, which are arranged consecutively in axial direction and are aligned with each other. However, in contrast to the design shown in FIG. 4 the cooling air channels 11 according to the fifth design are operated in co-flow with respect to the hot gas flow direction.

Figure 7:
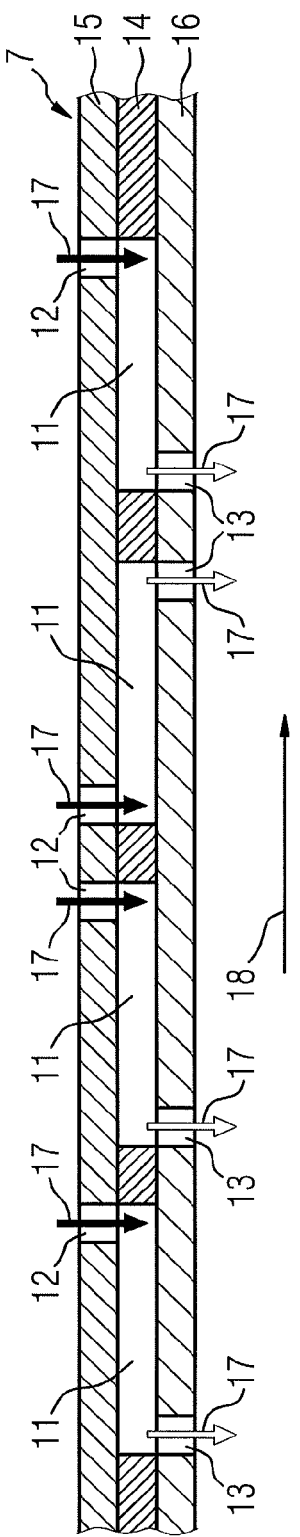
FIG. 7 is a schematic cross-sectional partial view of cooling air channels as shown in FIG. 2 formed according to a sixth design of the present invention.

FIG. 7 shows a sixth cooling channel design similar to the one shown in FIG. 5 with four cooling air channels 11, which are arranged consecutively in axial direction and are aligned with each other. However, seen from the left to the right in FIG. 7, the first, second and fourth cooling air channel 11 are operated in counter-flow, while the third cooling channel 11 is operated in co-flow with respect to the hot gas flow direction. This set up is especially beneficial if the head load in the region between the second and the third cooling air channel 11 is very high. In such regions it can be of advantage to have two inlets 12 close to each other to achieve a high cooling effectiveness.

FIGS. 8 to 10 show a seventh, eighth and ninth cooling air channel design according to the present invention, wherein the middle layer 14, the outer layer 15 and the inner layer 16, which are arranged above each other, are depicted transparently. These figures illustrate, that axially and circumferentially neighboring cooling air channels 11 can be provided in different co- and counter flow arrangements. The design according to FIG. 8 shows three rows cooling air channels 11, which are have a co-flow arrangement. The design according to FIG. 9 also shows three rows cooling air channels 11, wherein, when seen from the left to the right, the cooling air channels 11 of the first and the third row have a co-flow arrangement, and the ones of the second row have a counter-flow arrangement. The design according to FIG. 10 comprises three rows of cooling air channels, too, wherein the cooling air channels 11 of each row have co- and counter-flow arrangements. This set up is beneficial because the cooling effectiveness in each cooling air channel 11 is highest close to the inlet 12 due to the impingement effect, the inflow effect and the largest driving temperature difference. So with the shown alternating arrangement the most even cooling is ensured.

Figure 11:
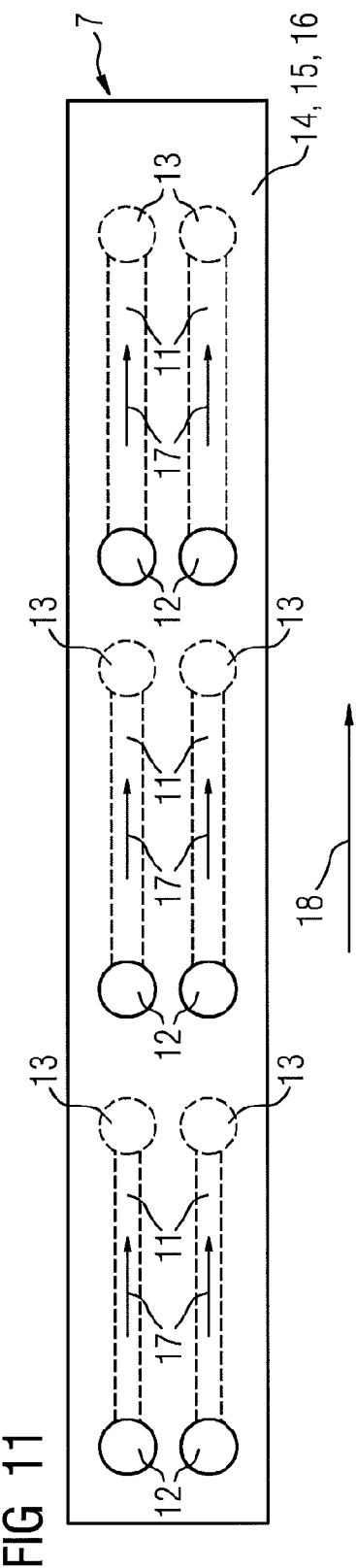
FIG. 11 is a schematic top partial view of cooling air channels as shown in FIG. 2 formed according to a tenth design of the present invention.

FIG. 11 shows a tenth cooling air channel design according to the present invention, which is similar to the seventh design shown in FIG. 8. However the cooling air channels 11 arranged in the first row, when seen from the left, have a smaller flow cross-section compared to the cooling air channels 11 arranged in the second and third row.

Figure 12:
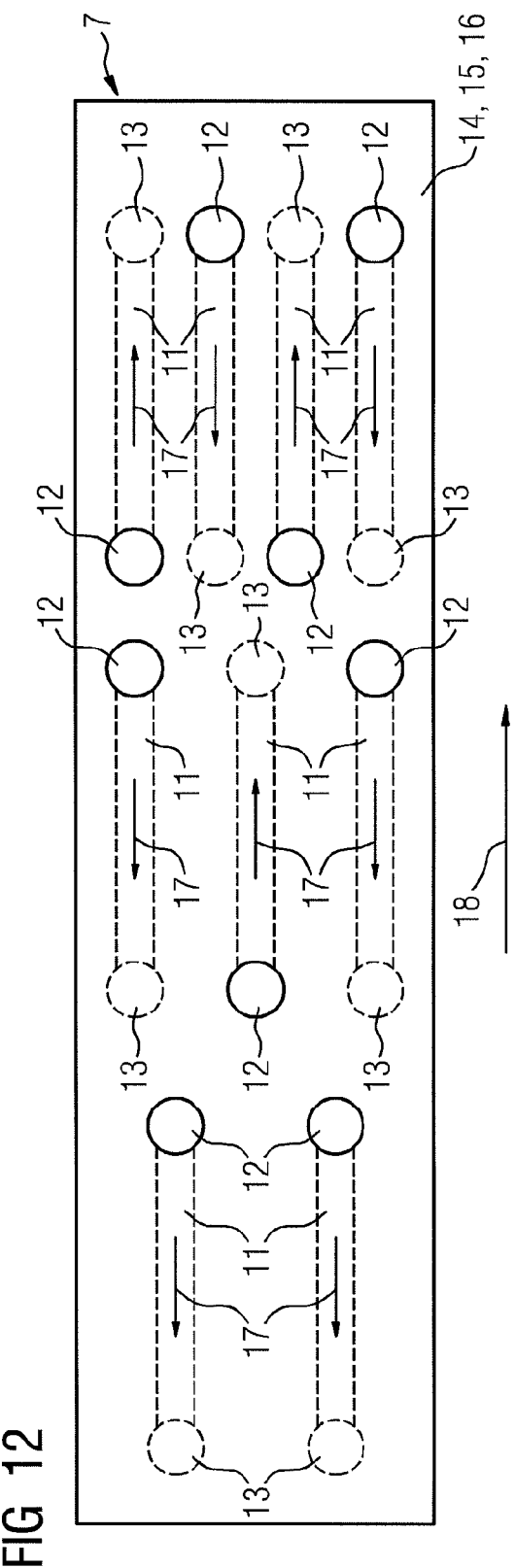
FIG. 12 is a schematic top partial view of cooling air channels as shown in FIG. 2 formed according to an eleventh design of the present invention.

FIG. 12 shows an eleventh cooling air channel design according to the present invention, which is similar to the ninth design shown in FIG. 10. However, in the first row only two cooling air channels 11 are provided having a different channel pitch than the cooling air channels 11 of the second and third row. Accordingly, the cooling air channels 11 of the first row are not axially aligned with the ones of the second and third row.

Figure 13:
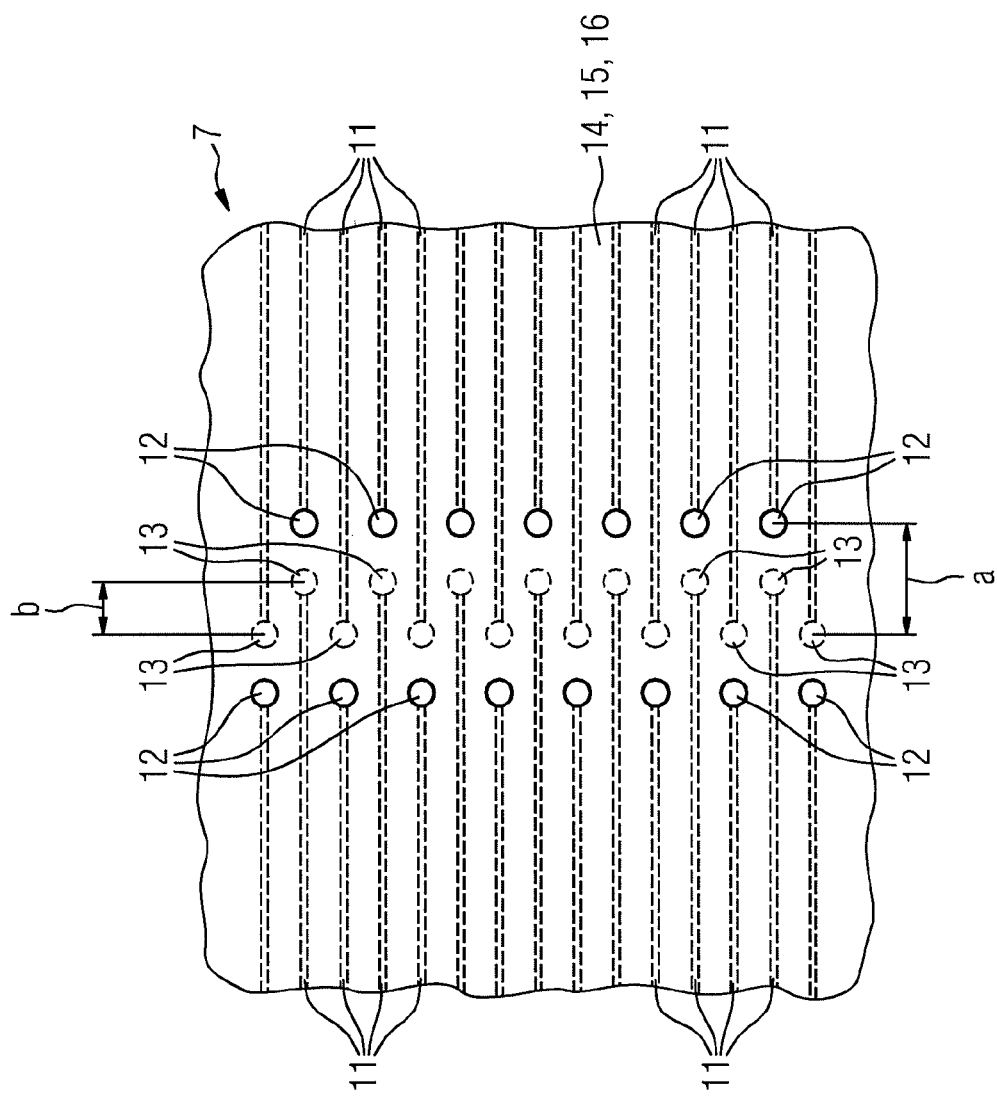
FIG. 13 is a schematic top partial view of cooling air channels as shown in FIG. 2 formed according to a twelfth design of the present invention.

FIG. 13 shows a twelfth cooling air channel design according to the present invention. Circumferentially neighboring cooling air channels 11 are arranged with an offset a in axial direction such that the cooling air channels 11 in successive rows partly overlap each other when viewed in the circumferential direction as shown by reference numeral b. Such a staggering of the cooling air channels 11 increases the mechanical robustness of the transition duct, which is in particular useful with respect to a three layer bonded panel design of the transition duct 7.

FIG. 14 shows a thirteenth cooling air channel design according to the present invention similar to the one shown in FIG. 8, wherein axially neighboring cooling air channels 11 have different length.

It should be noted, that the above-described embodiments only serve as examples and are not constrictive. Moreover, it should be noted, that the cooling efficiency and the mechanical robustness of the transition duct 7 can be locally varied by means of choosing the adequate number of cooling air channels 11, the adequate number of rows of cooling air channels 11 in axial direction, the adequate length, flow cross section and flow direction for each cooling air channel 11, and the adequate relative positions of the cooling air channels 11, e.g. with respect to staggering and pitch.

The invention claimed is:

1. A gas turbine system comprising:
    a burner arrangement having a tubular combustion chamber;
    a turbine; and
    a transition duct connecting the tubular combustion chamber and the turbine,
    wherein the transition duct includes a plurality of axially extending cooling air channels, wherein each axially extending cooling air channel is discrete and comprises:
        one single inlet opened through an outer surface of the transition duct, the one single inlet located at a first terminal end of the axially extending cooling air channel, and
        one single outlet opened through an inner surface of the transition duct, the one single outlet located at a second terminal end of the axially extending cooling air channel, the one single inlet and one single outlet being collinear along the axially extending cooling air channel,
    wherein the plurality of axially extending cooling air channels comprise a first row of circumferentially spaced, axially extending cooling air channels and a second row of circumferentially spaced, axially extending cooling air channels,
    wherein the first row and the second row are successively arranged in the axial direction,
    wherein a first group of the circumferentially neighboring axially extending cooling air channels in the first row includes respective axially extending cooling air channels having respective first portions, a second group of the circumferentially neighboring axially extending cooling air channels in the second row includes respective axially extending cooling air channels having respective second portions, and the first portions overlap and are interdigitated with the second portions in the axial direction.

2. The gas turbine system according to claim 1, wherein substantially an entire length of the transition duct includes axially extending cooling air channels of the plurality of axially extending cooling air channels.

3. The gas turbine system according to claim 1, wherein the circumferentially spaced, axially extending cooling air channels of the first row are arranged consecutively in the axial direction with the circumferentially spaced, axially extending cooling air channels of the second row.

4. The gas turbine system according to claim 3, wherein the circumferentially spaced, axially extending cooling air channels of the first row are aligned with circumferentially spaced, axially extending cooling air channels of the second row.

5. The gas turbine system according to claim 1, wherein at least one first axially extending cooling air channels has a different flow cross-section than at least one second axially extending cooling air channel.

6. The gas turbine system according to claim 1, wherein the axially extending cooling air channels have a co-flow directional arrangement with respect to a flow of combustion gases directed through the transition duct.

7. The gas turbine system according to claim 1, wherein the axially extending cooling air channels have a counter-flow directional arrangement with respect to a flow of combustion gases directed through the transition duct.

8. The gas turbine system according to claim 1, wherein the transition duct comprises a three layer bonded panel configuration, including a middle layer provided with elongated cutouts shaped and configured for defining the axially extending cooling air channels, and an outer layer and an inner layer which are respectively provided with holes defining the inlet and the outlet of each of the axially extending cooling air channels.

9. The gas turbine system according to claim 1, wherein the tubular combustion chamber has a free end which is inserted in the transition duct.

10. The gas turbine system according to claim 1, wherein each axially extending cooling air channel includes a downstream section and an upstream section, with respect to a flow of combustion gas through the transition duct, and the inlet of each axially extending cooling air channel of the first group of the circumferentially neighboring axially extending cooling air channels in the first row is located in the upstream section; and the outlet of each axially extending cooling air channel of the first group of the circumferentially neighboring axially extending cooling air channels in the first row is located in the downstream section.

* * * * *